(12) United States Patent
Noiri et al.

(10) Patent No.: US 8,042,141 B2
(45) Date of Patent: *Oct. 18, 2011

(54) CATV SYSTEM, MANAGEMENT DEVICE, CABLE MODEM AND PROGRAM

(75) Inventors: Shinsuke Noiri, Nisshin (JP); Hirotaka Naruse, Nisshin (JP)

(73) Assignee: Masprodenkoh Kabushikikaisha, Aichi-Ken (JP)

( * ) Notice: Subject to any disclaimer, the term of this patent is extended or adjusted under 35 U.S.C. 154(b) by 77 days.

This patent is subject to a terminal disclaimer.

(21) Appl. No.: 11/529,110

(22) Filed: Sep. 28, 2006

(65) Prior Publication Data

US 2008/0092187 A1  Apr. 17, 2008

(51) Int. Cl.
*H04N 7/173* (2011.01)
(52) U.S. Cl. .................... 725/105; 725/107; 725/111
(58) Field of Classification Search .......... 725/111, 725/107, 105; 370/40–401
See application file for complete search history.

(56) References Cited

U.S. PATENT DOCUMENTS

| | | | | |
|---|---|---|---|---|
| 4,787,085 | A * | 11/1988 | Suto et al. | 725/144 |
| 5,471,617 | A * | 11/1995 | Farrand et al. | 718/100 |
| 5,651,006 | A * | 7/1997 | Fujino et al. | 370/408 |
| 6,018,767 | A * | 1/2000 | Fijolek et al. | 725/111 |
| 6,223,222 | B1 * | 4/2001 | Fijolek et al. | 709/227 |
| 6,588,016 | B1 * | 7/2003 | Chen et al. | 725/111 |
| 6,839,355 | B1 * | 1/2005 | Saby et al. | 725/111 |
| 7,269,837 | B1 * | 9/2007 | Redling et al. | 725/51 |
| 2001/0017862 | A1 * | 8/2001 | Tokuyo et al. | 709/227 |
| 2003/0106067 | A1 * | 6/2003 | Hoskins et al. | 725/111 |
| 2004/0197082 | A1 * | 10/2004 | Yim | 725/58 |
| 2005/0183130 | A1 * | 8/2005 | Sadja et al. | 725/107 |

FOREIGN PATENT DOCUMENTS

| | | |
|---|---|---|
| JP | 9331325 | 12/1997 |
| JP | H09-331325 A | 12/1997 |
| JP | 2002288055 | 10/2002 |
| JP | 2003018151 | 1/2003 |
| JP | 2004254102 | 9/2004 |
| JP | 2004-282210 | 10/2004 |
| JP | 2004-282210 A | 10/2004 |
| JP | 2005033427 | 2/2005 |

OTHER PUBLICATIONS

Decision of Rejection , dated Aug. 10, 2010, issued in Japanese Patent Application No. 2005-179518 which corresponds to the U.S. Appl. No. 11/529,109. 2 pages.
English translation of the Decision of Rejection , dated Aug. 10, 2010. 2 pages.
Decision of Rejection , dated Sep. 14, 2010, issued in Japanese Patent Application No. 2005-179519 which corresponds to the U.S. Appl. No. 11/529,110. 3 pages.
Nglish translation of the Decision of Rejection , dated Sep. 14, 2010. 2 pages.
Background Material 1: Unexamined Japanese Patent Application Publication No. H09-107376 (Pub. Date: Apr. 22, 1997). 5 pages.

* cited by examiner

*Primary Examiner* — Brian Pendleton
*Assistant Examiner* — Fernando Alcon
(74) *Attorney, Agent, or Firm* — Davis & Bujold, P.L.L.C.

(57) ABSTRACT

A cable modem of a CATV system includes an address monitoring unit and a proxy requesting unit. The address monitoring unit monitors an address of at least one set top box connected to the cable modem based on a content of transmission sent to the cable modem from the set top box. The proxy requesting unit requests for sending relevant information about the set top box to an address indicated by monitoring result of the address monitoring unit, when the proxy requesting unit is requested for sending the relevant information by at least one management device connected to the cable modem via a CATV network.

12 Claims, 6 Drawing Sheets

CATV SYSTEM, MANAGEMENT DEVICE, CABLE MODEM AND PROGRAM

CROSS-REFERENCE TO RELATED APPLICATIONS

The disclosure of Japanese Patent Application No. 2005-179519 filed to the Japan Patent Office is incorporated herein by reference.

TECHNICAL FIELD OF THE INVENTION

This invention relates to a CATV system that requests a set top box to send relevant information about the set top box.

BACKGROUND

In a conventional CATV (Cable Television) system, as disclosed in Unexamined Japanese Patent Publication No. 2004-282210, various techniques are proposed to gather relevant information (including status information) about a set top box (a CATV transceiver) connected to a CATV network from the set top box.

Recently, a system that gathers relevant information about the set top box connected to the CATV network via a cable modem by a management device connected to the CATV network has been proposed.

In such a conventional system, in general, an IP address which is assigned to the cable modem is managed by the management device side, whereas an IP address which is assigned to the set top box connected to the cable modem is not managed by the management device side.

This is because the set top box differs from the cable modem in ways that the set top box is not always connected to the CATV network via the cable modem and is not always booted.

In other words, each time the set top box is booted while being connected to the CATV network, an IP address to be assigned to the set top box may be changed. Thereby, processing load for managing the IP address in the management device increases.

SUMMARY

In the system described above, the management device needs to verify the IP address of the set top box each time the management device requests the set top box to send the relevant information.

That is, the management device needs to perform an additional process such as checking a lending log of a DHCP (Dynamic Host Configuration Protocol) server, each time the management device requests the set top box to send the relevant information.

Therefore, the purpose of this invention is to surely request a set top box to send relevant information without increasing processing load of a management device.

In a first aspect of the present invention, a CATV system is provided with at least one management device, at least one cable modem connected to the management device via a CATV network, and at least one set top box connected to the cable modem. The management device, the cable modem and the set top box are configured as below.

The management device is provided with a relevant information requesting unit that requests for sending relevant information about the set top box to an address of the cable modem.

The cable modem is provided with an address monitoring unit, which monitors an address of the set top box based on a content of transmission sent from the set top box to the cable modem, and a proxy requesting unit, which requests for sending the relevant information to an address indicated by monitoring result of the address monitoring unit, when the cable modem is requested for sending the relevant information by the management device.

The set top box is provided with a relevant information sending unit that retrieves the relevant information from a prereserved memory area and sends the relevant information to a preassigned addressee, when the set top box is requested for sending the relevant information by the cable modem.

In this CATV system, the cable modem requests the set top box to send the relevant information by proxy for the management device. Thereby, there is only need for the management device to manage the address of the cable modem and is no need for the management device to verify the address of the set top box when the management device requests for sending the relevant information.

Also, in this CATV system, the cable modem monitors the address of the set top box and requests for the relevant information to the address indicated by the monitoring result. Thereby, the cable modem can surely request the set top box for the relevant information even though the address of the set top box is changed.

Therefore, this CATV system can surely request the set top box to send the relevant information without increasing processing load of the management device.

The address monitoring unit of the cable modem may monitor the address of the set top box in any manner based on the content of transmission from the set top box to the cable modem.

For example, the set top box may be provided with an address providing unit that provides the address of the set top box to a content of transmission to be sent to the cable modem. Then, the address monitoring unit of the cable modem extracts the address of the set top box from the content of transmission each time the cable modem receives the content of transmission from the set top box, and thereby the address of the set top box may be monitored.

In this case, the address monitoring unit of the cable modem can identify the address of the set top box each time the cable modem receives the content of transmission from the set top box.

Moreover, the management device may be provided with a relevant information gathering unit that gathers the relevant information from the addressee of the relevant information sent from the set top box.

In this case, the management device can not only request for sending the relevant information, but also gather the relevant information.

The relevant information sending unit of the set top box may be assigned with any addressee for the relevant information.

For example, the relevant information sending unit of the set top box may be adapted to send the relevant information to the cable modem as the preassigned addressee. At the same time, the cable modem may be provided with a proxy sending unit that receives the relevant information sent from the set top box and sends the relevant information to the management device.

Accordingly, the cable modem can not only request the set top box to send the relevant information by proxy for the management device, but also receive the relevant information from the set top box by proxy for the management device and send the relevant information to the management device.

In other words, the management device can gather the relevant information without increasing processing load of the management device.

In a second aspect of the present invention, the management device is provided with a relevant information requesting unit that requests for relevant information about at least one set top box connected to a cable modem, to an address of at least one cable modem connected to the management device via the CATV network.

According to the management device, a portion of the above mentioned CATV system can be realized.

This management device may be provided with a relevant information gathering unit that gathers the relevant information from the addressee of the relevant information sent from the set top box.

In a third aspect of the present invention, a cable modem is provided with an address monitoring unit that monitors an address of at least one set top box connected to the cable modem based on a content of transmission sent from the set top box to the cable modem and a proxy requesting unit that requests for sending relevant information about the set top box to the address indicated by the monitoring result of the address monitoring unit, when the cable modem is requested for sending the relevant information by at least one management device connected to the cable modem via the CATV network.

According to the cable modem, a portion of the above mentioned CATV system can be realized.

The cable modem may be provided with a proxy sending unit that receives the relevant information sent from the set top box and sends the relevant information to the management device.

The cable modem may be separated from the set top box or integrated with the set top box.

If the cable modem is integrated with the set top box, the connection between the cable modem and the set top box is fixed, and thereby the cable modem can be prohibited mis-monitoring an address of a device other than the address of the set top box.

In a fourth aspect of the present invention, a program is to make a computer function as the relevant information requesting unit of the management device of the present invention.

According to this program, the computer can be functioned as the relevant information requesting unit.

In a fifth aspect of the present invention, a program is to make a computer function as the relevant information gathering unit of the management device of the present invention.

According to this program, the computer can be functioned as the relevant information gathering unit.

In a sixth aspect of the present invention, a program is to make a computer function as the address monitoring unit of the cable modem of the present invention.

According to this program, the computer can be functioned as the address monitoring unit of the cable modem.

In a seventh aspect of the present invention, a program is to make a computer function as the proxy requesting unit of the cable modem of the present invention.

According to this program, the computer can be functioned as the proxy requesting unit.

In an eighth aspect of the present invention, a program is to make a computer function as the proxy sending unit of the cable modem of the present invention.

According to this program, the computer can be functioned as the proxy sending unit.

Each program discussed above includes a group of commands to be executed by a computer. These programs may be stored in ROM or RAM for backup, and may be loaded to the computer from the ROM or the RAM for backup to be used. Also, these programs may be loaded to the computer via a network to be used.

Moreover, these programs may be recorded on a computer-readable recording medium such as a flexible disk (FD), an optical disk (MO), a DVD, a CD-ROM, a Blu-ray disk, a HD-DVD, a hard disk and a memory card, and be loaded to the computer from these recording mediums to be used.

BRIEF DESCRIPTION OF THE DRAWINGS

An embodiment as the best mode to carry out the present invention will be described in detail below based on drawings.

THE BEST MODE TO CARRY OUT THE INVENTION

First Embodiment (1) Entire Configuration of CATV System 1

Figure 1:
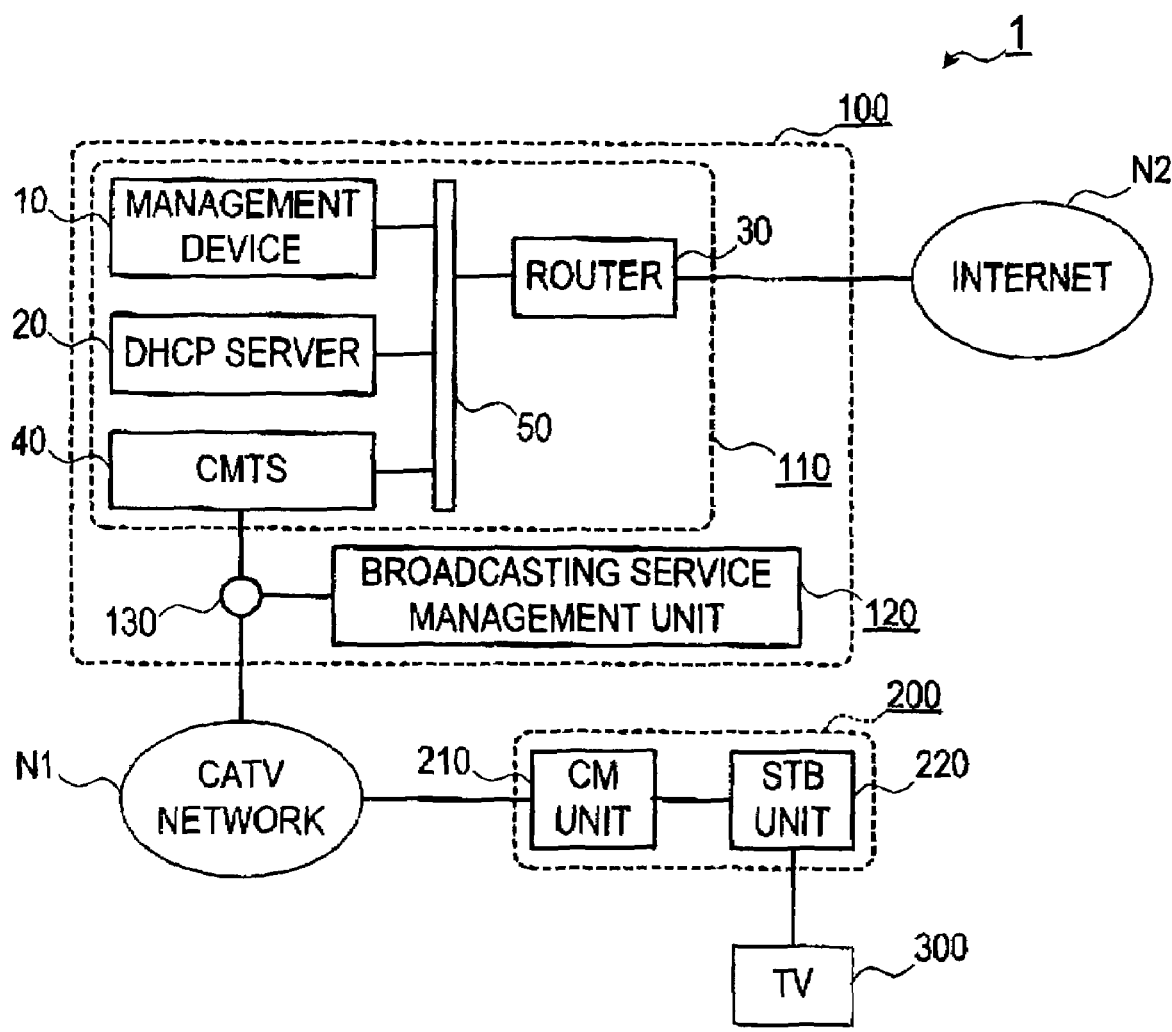
FIG. 1 is a block diagram showing a structure of a CATV system according to a first embodiment.

As shown in FIG. 1, a CATV system 1 is provided with a CATV center 100 and a plurality of set top boxes 200. The CATV center 100 and the set top boxes 200 are connected to one another via a CATV network N1. FIG. 1 shows only one of the set top boxes 200 in order to simplify an explanation.

The CATV center 100 is provided with a network management unit 110 and a broadcasting service management unit 120 (i.e. headend). The network management unit 110 and the broadcasting service management unit 120 are connected to the CATV network N1 via a mixer 130.

The network management unit 110 is provided with a management device 10, a DHCP server 20, a router 30 and a cable modem termination system (CMTS) 40. The management device 10, the DHCP server 20, the router 30 and the CMTS 40 are connected to one another via a hub 50.

Figure 2A:
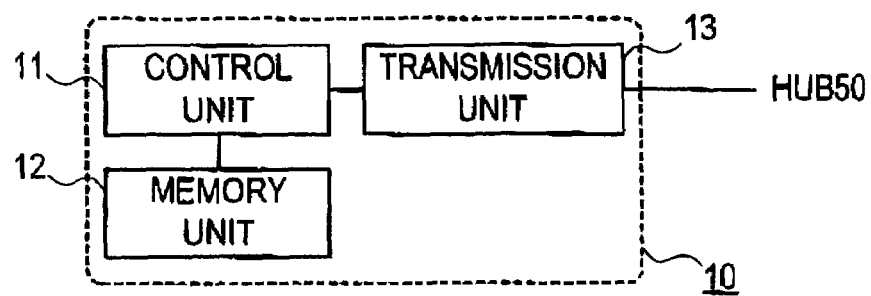
FIG. 2A is a block diagram showing a structure of a management device.

The management device 10 includes a well-known computer system. More specifically, the management device 10 is provided with a control unit 11, a memory unit 12 and a transmission unit 13 (see FIG. 2A).

The control unit 11 includes a well-known CPU, a well-known main memory device (e.g. ROM, RAM) and a well-known peripheral circuitry (e.g. I/O). The control unit 11 executes various processes in accordance with various programs stored in the memory unit 12.

The memory unit 12 includes a well-known secondary memory device (e.g. a hard disk drive). Programs are preinstalled in the memory unit 12. One of the programs is for the control unit 11 to gather relevant information about the set top box 200. In the present embodiment, a SNMP (Simple Network Management Protocol) manager is preinstalled in the memory unit 12 as the program to gather the relevant information. Specifically, the relevant information in the present embodiment refers to a history of channels selected by a TV set 300, which will be hereinafter described, via the set top box 200, a signal level of selected channels, quality information about a SN ratio or a bit error rate of selected channels, and status information indicating a version of a software (a firmware) of the set top box 200.

The transmission unit 13 includes a well-known transmission interface.

The DHCP server 20 is a well-known DHCP server. The DHCP server 20 assigns an IP address to each device on the CATV network N1 in accordance with DHCP (Dynamic Host Configuration Protocol).

The router 30 is a well-known router. The router 30 is connected to the network management unit 110 and an internet N2. The router 30 allows two-way communication between the network management unit 110 and the internet N2.

The CMTS 40 is a well-known CMTS. The CMTS 40 is connected to the network management unit 110 and the CATV network N1. The CMTS 40 allows two-way communication between the network management unit 110 and the CATV network N1 via the mixer 130.

The set top box 200 is integrally provided with a cable modem (CM) unit 210 and a set top box (STB) unit 220. The cable modem unit 210 and the set top box unit 220 are connected to one another.

The cable modem unit 210 is connected to the CATV center 100 via the CATV network N1 in addition to the set top box unit 220. The cable modem unit 210 functions as a so-called bridge, and relays the CATV network N1 and the set top box unit 220 at the level of the data link layer of the OSI (Open System Interconnection) reference model.

Figure 2B:
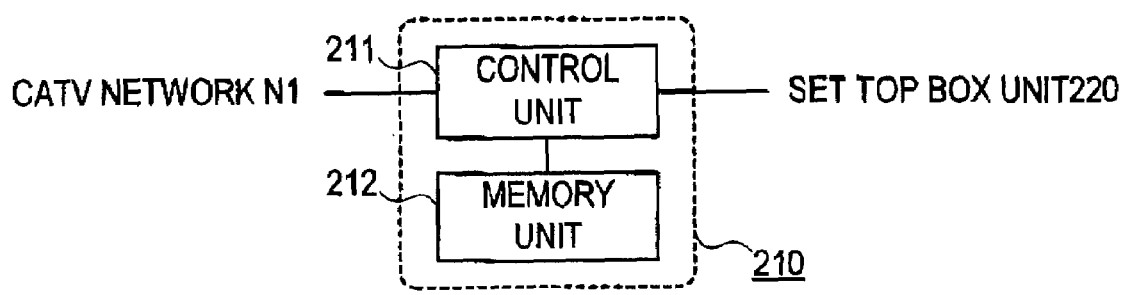
FIG. 2B is a block diagram showing a structure of a cable modem unit.

More specifically, the cable modem unit 210 is provided with a control unit 211 and a memory unit 212 (see FIG. 2B).

The control unit 211 includes a well-known CPU, a well-known peripheral circuitry and a well-known transmission interface. The control unit 211 executes various processes in accordance with various programs stored in the memory unit 212.

The memory unit 212 includes a well-known main memory device. The memory unit 212 stores a database (MIB: Management Information Base in the present embodiment) where various information is registered, a program (SNMP agent in the present embodiment) for the control unit 211 to perform notification or change of information registered in the database according to a command from outside, and a program for the control unit 211 to set up an IP address, which is assigned to the cable modem 210 by the DHCP server 20, in the memory unit 12.

The set top box unit 220 is connected to a TV set 300 in addition to the cable modem unit 210.

Figure 2C:
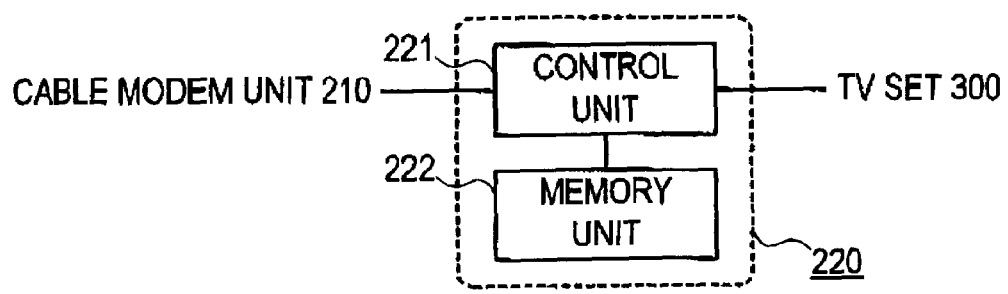
FIG. 2C is a block diagram showing a structure of a set top box unit.

More specifically, the set top box unit 220 is provided with a control unit 221 and a memory unit 222 (See FIG. 2C).

The control unit 221 includes a well-known CPU, a well-known peripheral circuitry and a well-known transmission interface. The control unit 221 executes various processes in accordance with various programs stored in the memory unit 222.

The memory unit 222 includes a well-known main memory device. The memory unit 222 stores a database (MIB in the present embodiment) where the relevant information is registered, a program (SNMP agent in the present embodiment) for the control unit 211 to perform notification or change of the relevant information registered in the database according to a command from outside, and a program for the control unit 221 to set up an IP address, which is assigned to the set top box unit 220 by the DHCP server 20 in the memory unit 222.

(2) Process of Monitoring Address

Figure 3:
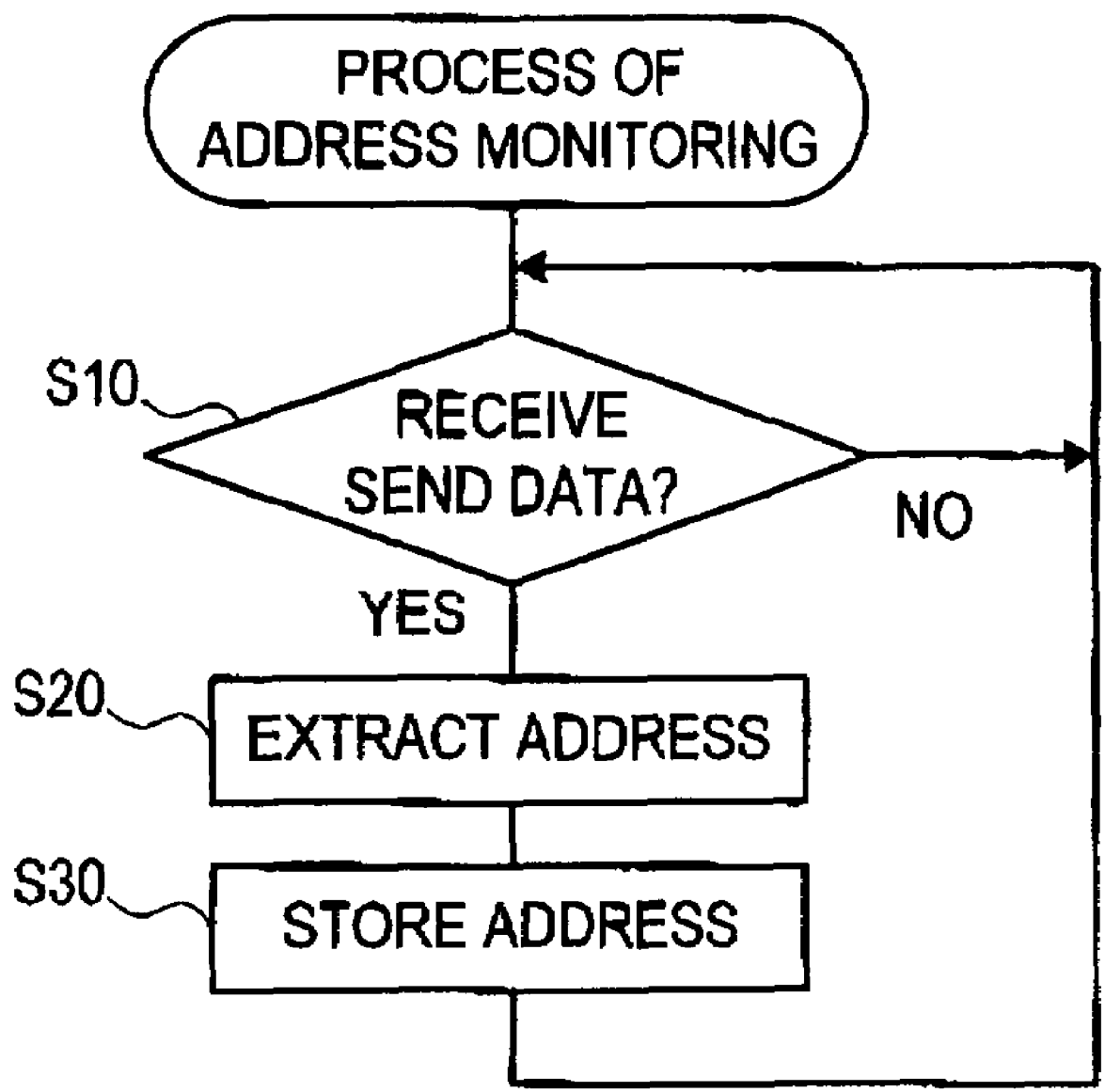
FIG. 3 is a flowchart illustrating processes executed by a control unit of a cable modem unit in order to monitor an address of the set top box unit according to the first embodiment.

With reference to FIG. 3, the process of monitoring address will be explained. The process of monitoring address is executed by the control unit 211 in order to monitor an address of the set top box unit 220.

The control unit 211 waits until the control unit 211 receives send data (packet) from the set top box unit 220 (S10: NO). More specifically, the control unit 211 determines whether or not the control unit 211 receives the send data including unique MAC (Media Access Control) address of the set top box unit 220.

When the control unit 221 receives the send data from the set top box unit 220 (S10: YES), the control unit 221 extracts an IP address within header information of the send data as a source of the send data (S20).

Then, the control unit 211 stores the extracted IP address in the memory unit 212 as an IP address of the set top box unit 220 (S30).

The control unit 211 monitors the address of the set top box unit 220 by repeating the above processes of S10 to S30.

(3) Process of Gathering the Relevant Information

Figure 4:
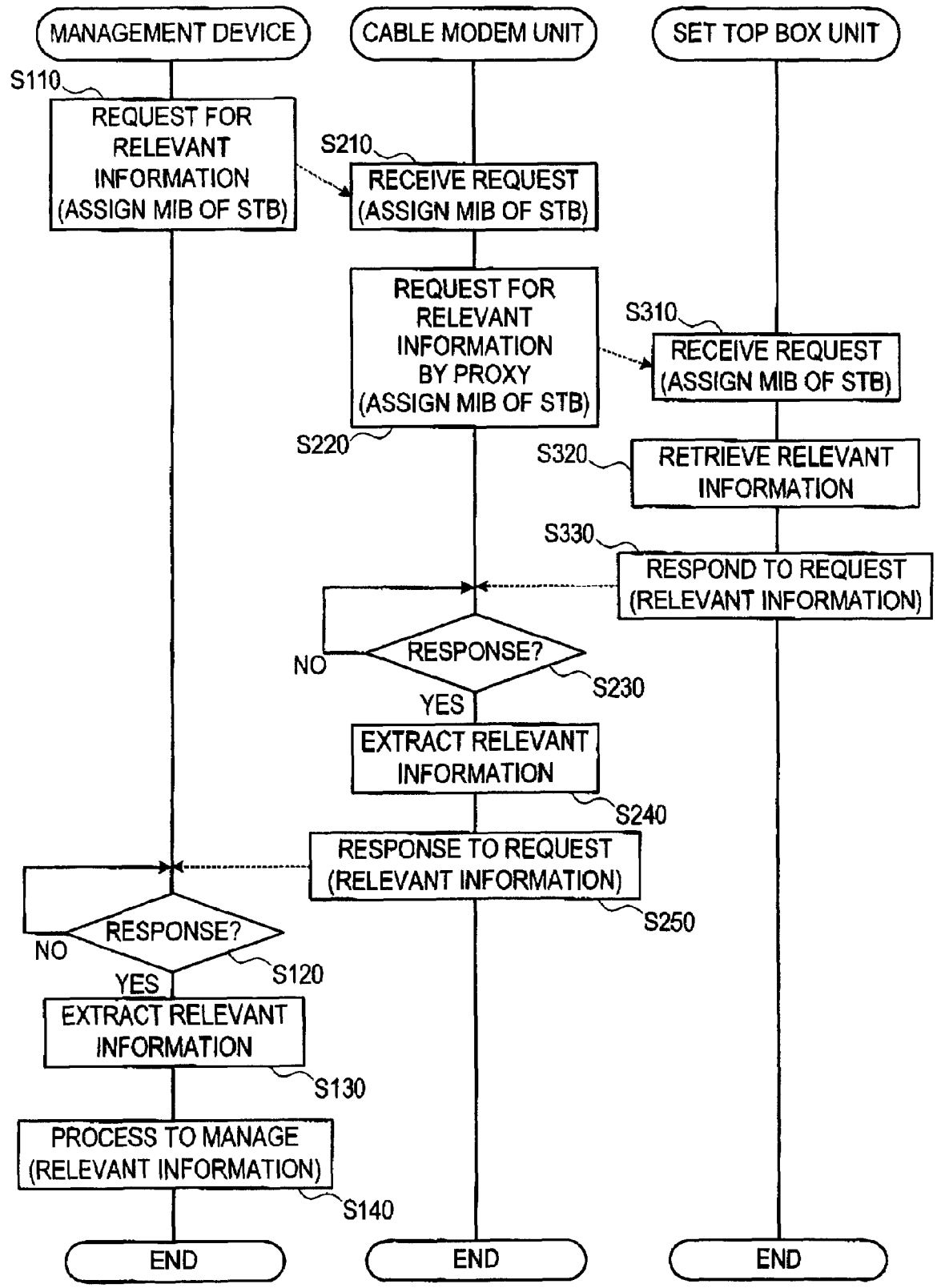
FIG. 4 is a flowchart illustrating processes executed in the CATV system in order to gather relevant information according to the first embodiment.

With reference to FIG. 4, processes to be executed by the control unit 11 of the management device 10, the control unit 211 of the cable modem unit 210 and the control unit 221 of the set top box unit 220 will be explained. These processes are executed when the management device 10 gathers the relevant information (the status information) from the set top box unit 220.

The control unit 11 of the management device 10 sends a command for requesting the relevant information stored in the set top box unit 220 to the cable modem unit 210 (S110) when a timing (e.g. a preset time or a timing for the operator to perform operation) for gathering the relevant information comes. The control unit 11 of the management device 10 waits until the control unit 11 receives a response to the command from the cable modem unit 210 (S120: NO). At S110, the control unit 11 sends the above command to the IP address of the cable modem unit 210 (which is assigned by the DHCP server 20) that is managed by the CATV center 100. More specifically, as the above command, the control unit 11 sends SNMP request (Get-Request) specifying an ID (Object ID) of the relevant information in the MIB, which is stored in the set top box unit 220.

When the control unit 211 of the cable modem unit 210 receives the command from the management device 10 (S210), the control unit 211 sends a command for requesting the relevant information to the set top box unit 220 connected to the cable modem unit 210 (S220) and waits until the control unit 211 receives a response to the command from the set top box unit 220 (S230: NO). At S220, if the ID specified by the SNMP request from the management device 10 is not one of the IDs in the MIB of the cable modem unit 210, the control unit 211 sends the SNMP request specifying the ID to the IP address of the cable modem unit 220 as a request to the above command.

When the control unit 221 of the set top box unit 220 receives the command from the cable modem unit 210 (S310), based on the command, the control unit 221 retrieves the relevant information from the MIB stored in the memory unit 222 of the set top box unit 220 (S320) and sends the relevant information to the cable modem unit 210 as the response to the cable modem unit 210 (S330). At S320 and S330, the control unit 221 retrieves the relevant information from the MIB in the memory unit 222 based on the ID assigned by the SNMP request from the cable modem unit 210 and sends the relevant information to the IP address of the cable modem unit 210 as a SNMP response (Get-Response).

When the control unit 211 of the cable modem 210 receives the response from the set top box unit 220 (S230: YES), the control unit 211 extracts the relevant information from the response (S240) and sends the relevant information to the management device 10 (S260). At S230 to S250, the control unit 211 receives the response to the IP address of the cable modem unit 210 and extracts the relevant information included in the response. Then, the control unit 211 sends the relevant information to the IP address of the management device 10 as the SNMP response.

When the control unit 11 of the management device 10 receives the response from the cable modem unit 210 (S120: YES), the control unit 11 extracts the relevant information from the response (S130) and executes a process to manage the relevant information (S140). At S140, the control unit 11 performs a process for compiling the relevant information and the like after storing the relevant information in the predetermined memory area of the memory unit 12 of the management device 10.

(4) Operation and Effect of the CATV System 1

As discussed above, in the CATV system 1, the cable modem unit 210 requests the set top box unit 220 to send relevant information about the set top box unit 220 by proxy for the management device 10. Thereby, there is only need for the management device 10 to manage (ascertain) the IP address of the cable modem unit 210, and no need for the management device 10 to verify the IP address of the set top box unit 220 when the management device 10 requests for sending the relevant information.

Also, in this CATV system 1, the cable modem unit 210 monitors the IP address of the set top box 220 and requests for the relevant information to the IP address indicated by the monitoring result. Thereby, the cable modem unit 210 can surely request the set top box unit 220 for the relevant information even though the IP address of the set top box unit 220 is changed.

Therefore, the CATV system 1 can surely request the set top box unit 220 to send the relevant information without increasing processing load of the management device 10.

The cable modem unit 210 extracts the IP address of the set top box unit 220 provided to the send data each time the cable modem unit 210 receives the send data from the set top box unit 220, and thereby the cable modem unit 210 can identify the IP address of the set top box unit 220 each time the cable modem unit 210 receives the send data from the set top box unit 220.

Moreover, in the CATV system 1, the cable modem unit 210 receives the relevant information from the set top box unit 220 by proxy for the management device 10 and sends the relevant information to the management device 10. Thereby, the management device 10 can gather the relevant information without increasing processing load of the management device 10.

In addition, in the CATV system 1, the cable modem unit 210 is integrated with the set top box unit 220, and the connection between the cable modem unit 210 and the set top box unit 220 is fixed. The cable modem unit 210 monitors only the send data including the MAC address of the set top box unit 220.

Therefore, in the CATV system 1, the cable modem unit 210 can be prohibited mismonitoring an address of a device other than the address of the set top box.

Second Embodiment (1) Entire Structure of CATV System 2

A CATV system 2 is the CATV system 1 in the first embodiment with modification in some parts.

Therefore, in here, only structural and processing differences between the CATV system 1 and the CATV system 2 will be explained in detail, while the same numeral will be used for the same structures and processes, and the explanation for the same structures and processes will be abbreviated.

Figure 5:
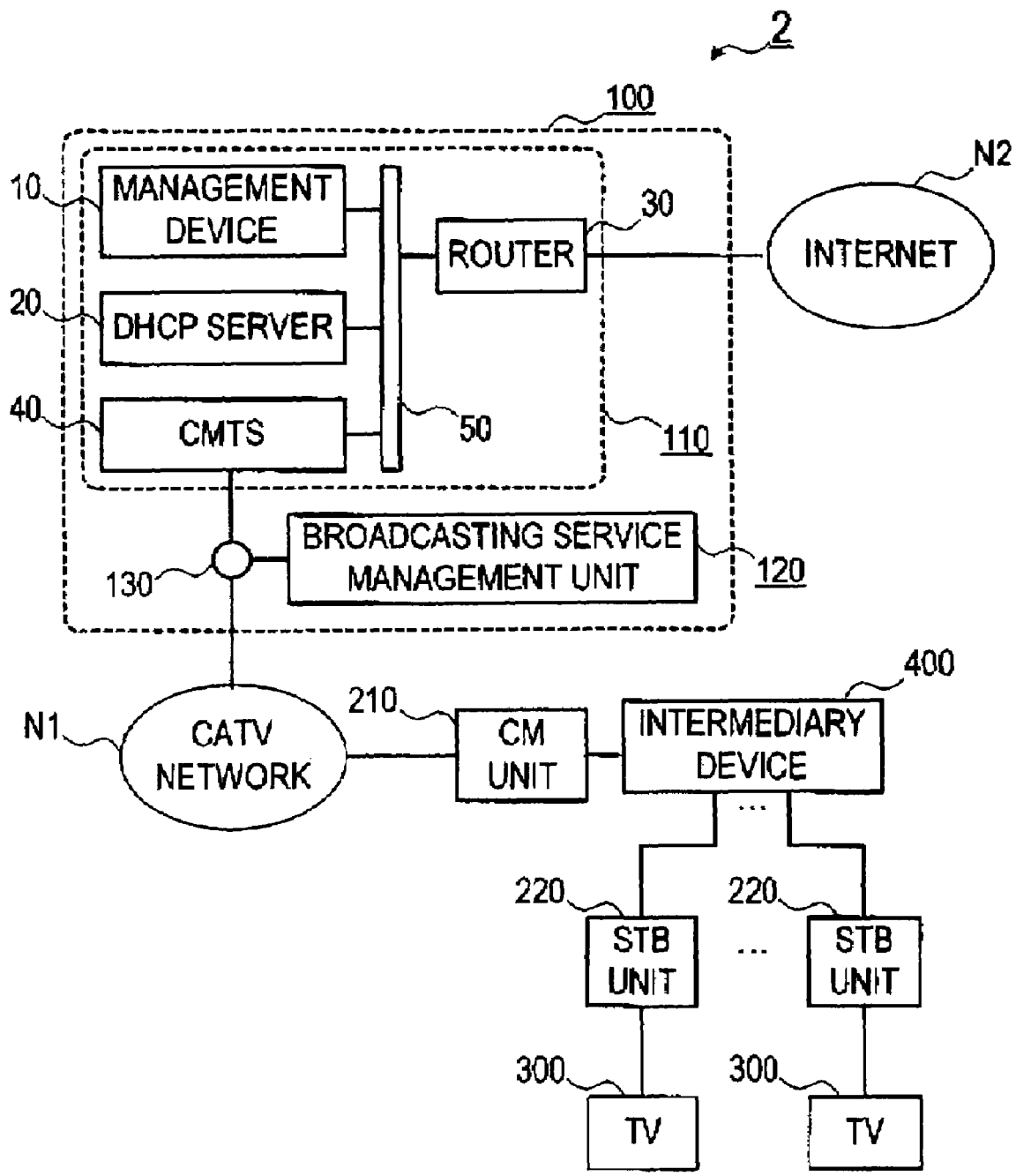
FIG. 5 is a block diagram showing a structure of a CATV system according to a second embodiment; and, FIG. 6 is a flowchart illustrating processes executed in the CATV system in order to gather relevant information according to the second embodiment.

As shown in FIG. 5, the CATV system 2 is provided with a cable modem unit 210 and a set top box unit 220 as separate devices that are independent from one another.

And, each cable modem 210 is connected to a plurality of set top box units 220 via an intermediary device 400 such as a hub and a router.

The number of the set top box units 220 connected to the cable modem unit 210 and identification numbers to specify these set top box units 220 are prestored in the memory unit 212 of the cable modem unit 210.

(2) Process of Gathering the Relevant Information

Figure 6:
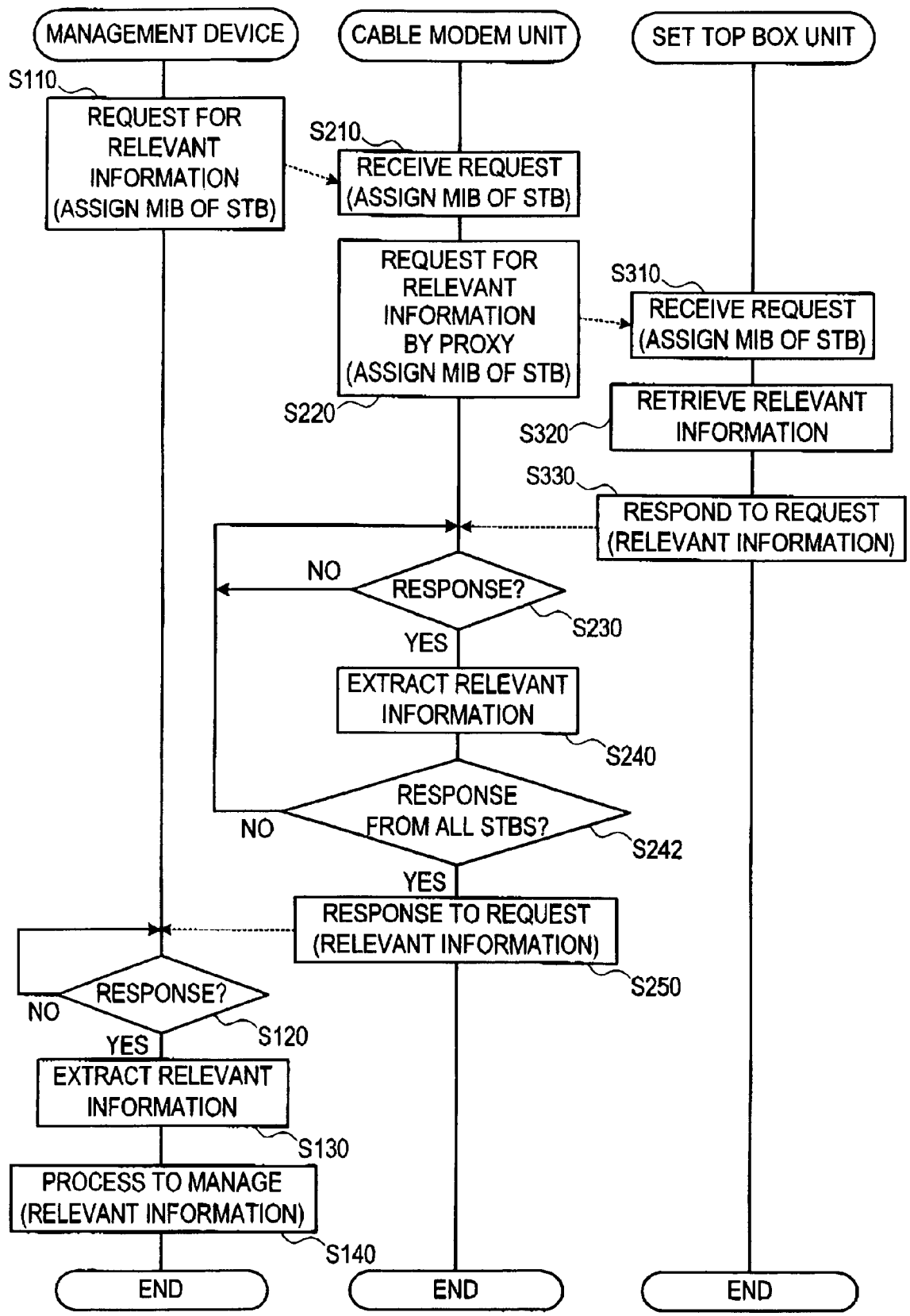

As shown in FIG. 6, when the control unit 211 of the cable modem unit 210 receives a request for the relevant information from the management device 10, the control unit 211 sends the request to all the set top box units 220 connected to the cable modem unit 210 (S220), and the control unit 211 repeats processes of S230 and S240 until the control unit 211 receives responses from all the set top box units 220 (S242: NO). Then, when the control unit 211 receives the responses from all the set top box units 220 (S242:YES), the control unit 211 sends the relevant information about all the set top box units 220 to the cable modem unit 210 as the response to the command from the management device 10 (S250).

(3) Operation and Effect of CATV System 2

In the CATV system 2, the management device 10 can obtain the relevant information about all the set top box units 220 without managing the IP addresses of all the set top box units 220 connected to the cable modem unit 210 as long as the management device 10 manages (ascertains) the IP address of the cable modem unit 210.

The cable modem unit 210 may regularly monitor whether or not the cable modem unit 210 can perform transmission with each set top box unit 220 connected to the cable modem unit 210, and request for the relevant information only to the transmissionable set top box unit 220.

3. Modification

Although the embodiments of the present invention have been described above, this invention is not limited to the first and the second embodiments discussed above. It will be obvious that this invention can take various forms without departing from the scope of this invention.

For example, in the first and the second embodiments, the relevant information refers to the status information about the set top box 200 (or the TV set 300). However, the relevant information may include information other than the status information.

Moreover, in the first and the second embodiments, the addressee of the relevant information of the set top box unit 220 is set to the cable modem unit 210. However, the addressee may be set to other than the cable modem unit 210. In this case, the management device 10 may gather the relevant information from the addressees other than the cable modem unit 210.

In the first and second embodiments, the CATV system 1 is provided with only one management device 10, but the CATV system 1 may be provided with a plurality of the management devices 10.

Additionally, in the first and the second embodiments, the CPUs are the components of the control unit 11 of the management device 10, the control unit 211 of the cable modem unit 210 and the control unit 221 of the set top box unit 220. However, an ASIC (Application Specific Integrated Circuit) or a Programmable Logic Device (e.g. FPGA) and the like, for example, can be components for those units instead of the CPUs.

What is claimed is:

1. A CATV system comprising:
   at least one management device;
   at least one cable modem connected to the at least one management device via a CATV network; and
   at least one set top box physically connected to the at least one cable modem;
   wherein the at least one management device is configured to
   issue a request for sending relevant information about the at least one set top box to an address of the at least one cable modem, designating an address of the at least one cable modem instead of designating an address of the at least one set top box; and
   gather the relevant information sent from all of the at least one set top box;
   wherein the at least one cable modem
   monitors an address of the at least one set top box based on a content of transmission sent from the at least one set top box to the at least one cable modem;
   wherein the at least one cable modem includes:
      a memory unit that stores a number representing the number of the at least one set top box and an identification number corresponding to each of the at least one set top box to identify the corresponding at least one set top box;
      the at least one cable modem is further configured to issue a request for sending the relevant information to the address indicated by monitoring result of the at least one cable modem, based on the total number of the at least one set top box and the identification number of each of the at least one set top box which are stored in the memory unit, when the at least one cable modem is requested to send the relevant information from the at least one management device; and
      based on the number representing the number of the at least one set top box and the identification number of each of the at least one set top box, receive the relevant information sent from each of the at least one set top box, and, if a determination is made that a response has not been received from all of the at least one set top box, then again look for a response from each non-responding at least one set top box until receiving the relevant information from all of the at least one set top box;
   once the relevant information is received from all of the at least one set top box, the cable modem then sends all of the received relevant information from all of the at least one set top box to the at least one management device; and
   the at least one set top box retrieves the relevant information from a pre-reserved memory area and sends the relevant information to the at least one cable modem, when the at least one set top box is requested for sending the relevant information by the at least one cable modem.

2. The CATV system according to claim 1,
   wherein the at least one set top box further provides an address of the at least one set top box to a content of transmission to be sent to the at least one cable modem; and
   the at least one cable modem monitors the address of the at least one set top box by extracting the address from the content of transmission each time the at least one cable modem receives the content of transmission from the at least one set top box.

3. A cable modem comprising:
   a memory unit that stores a number representing the number of at least one set top box physically connected to the cable modem and an identification number corresponding to each of the at least one set top box to identify the corresponding at least one set top box;
   the cable modem is further configured to:
   monitor an address of the at least one set top box physically connected to the cable modem based on a content of transmission sent to the cable modem from the at least one set top box;
   issue a request for sending relevant information about the at least one set top box to an address indicated by a monitoring result based on the total number of the at least one set top box and the identification number of each of the at least one set top box which are stored in the memory unit, when the cable modem is requested for sending the relevant information by at least one management device connected to the cable modem via the CATV network; and
   based on the number representing the number of the at least one set top box and the identification number of each of the at least one set top box, receive the relevant information sent from each of the at least one set top box, and, if a determination is made that a response has not been received from all of the at least one set top box, then the cable modem again looks for a response from each non-responding at least one set top box until receiving the relevant information from all of the at least one set top box and once the relevant information is received from all of the at least one set top box, the cable modem then sends all of the received relevant information from all of the at least one set top box to the at least one management device.

4. The cable modem according to claim 3 wherein the cable modem is integrated with the at least one set top box.

5. The cable modem according to claim 3, further comprising a non-transitory computer-readable storage medium, that stores a program which, when executed by the cable modem, gathers information from all of the connected set top boxes.

6. A non-transitory computer-readable storage medium, that stores a program which, when executed,
   causes a cable modem, which includes a memory unit that stores a number representing the number of at least one set top box physically connected to the cable modem and an identification number corresponding to each of the at least one set top box to identify the corresponding at least one set top box, to gather information from all of the connected set top boxes; and
   further causes the cable modem to monitor an address of the at least one set top box physically connected to the cable modem based on a content of transmission sent to the cable modem from the at least one set top box;
   still further causes the cable modem to issue a request for sending relevant information about the at least one set top box to an address indicated by monitoring result based on the total number of the at least one set top box and the identification number of each of the at least one set top box which are stored in the memory unit, when the cable modem is requested to send the relevant information by at least one management device connected to the cable modem via the CATV network, and based on the number representing the number of the at least one set top box and the identification number of each of the at least one set top box, receive the relevant information sent from each of the at least one set top box, and, if a determination is made that a response has not been received from all of the at least one set top box, then again look for a response from each non-responding at least one set top box until receiving the relevant information from all of the at least one set top box and once the relevant information is received from all of the at least one set top box, then send all of the received relevant information from all of the at least one set top box to the at least one management device.

7. The CATV system according to claim 1, further comprising:

a DHCP server; a cable modem termination system;

a hub; and a mixer wherein the at least one management device is connected to the DHCP server and the cable modem termination system, via the hub, the mixer is connected to the CATV network and the cable modem termination system.

8. The CATV system according to claim 7, further comprising a broadcasting service management unit connected to the mixer.

9. The CATV system according to claim 1, wherein the at least one set top box comprises a plurality of set top boxes.

10. The cable modem according to claim 3, wherein the at least one set top box comprises a plurality of set top boxes.

11. The non-transitory computer-readable storage medium according to claim 6, wherein the at least one set top box comprises a plurality of set top boxes.

12. The cable modem according to claim 3, further comprising a non-transitory computer-readable storage medium, that stores a program which, when executed, by the cable modem gathers information from all of the connected set top boxes.

* * * * *